United States Patent

[11] 3,614,214

[72] Inventors Tom N. Cornsweet
  Atherton;
  George J. Eilers, Redwood City; Hewitt D. Crane, Portola Valley, all of Calif.
[21] Appl. No. 70,648
[22] Filed Sept. 9, 1970
[45] Patented Oct. 19, 1971
[73] Assignee Stanford Research Institute
  Menlo Park, Calif.

[54] METHOD AND SYSTEM FOR TAKING PHOTOGRAPHS OF AN EYE FUNDUS
  9 Claims, 4 Drawing Figs.
[52] U.S. Cl. .................................................. 351/7,
  351/13, 351/14, 351/16, 351/39, 356/124
[51] Int. Cl. .................................................. A61b 3/10,
  A61b 3/14, G01b 9/00
[50] Field of Search ........................................... 351/7, 13,
  14, 16, 39, 6, 1; 356/120, 124

[56] References Cited
  UNITED STATES PATENTS
  3,016,000  1/1962  Noyori .......................... 95/12
  OTHER REFERENCES
  F. W. Campbell et al., " High Speed Infrared Optometer," JOSA, Vol. 49, No. 3, Mar. 1959 pp. 268– 272

*Primary Examiner*—David Schonberg
*Assistant Examiner*—Paul A. Sacher
*Attorney*—Flehr, Hohbach, Test, Albritton & Herbert

ABSTRACT: An optical system and method for photographing an eye fundus in which a fundus camera having a focus control is aligned with the position of an eyelens. An automatic optometer is coupled to the fundus camera and is adapted to sense refractive power of the eye. Means are coupled to the automatic optometer and the fundus camera for controlling the focus of the fundus camera and activating the fundus camera to take a photograph when the focus of the fundus camera matches the instantaneous refractive power of the eye.

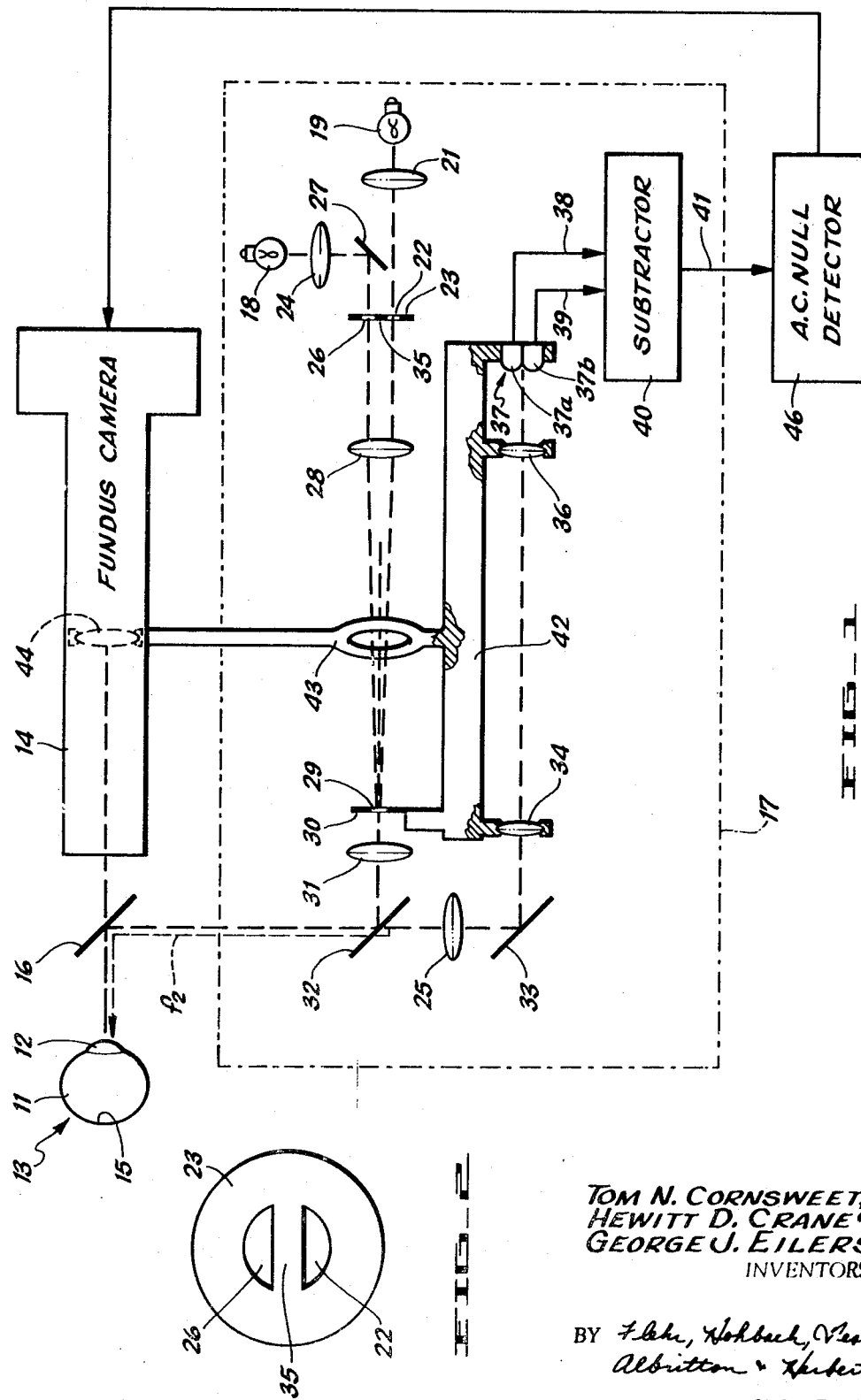

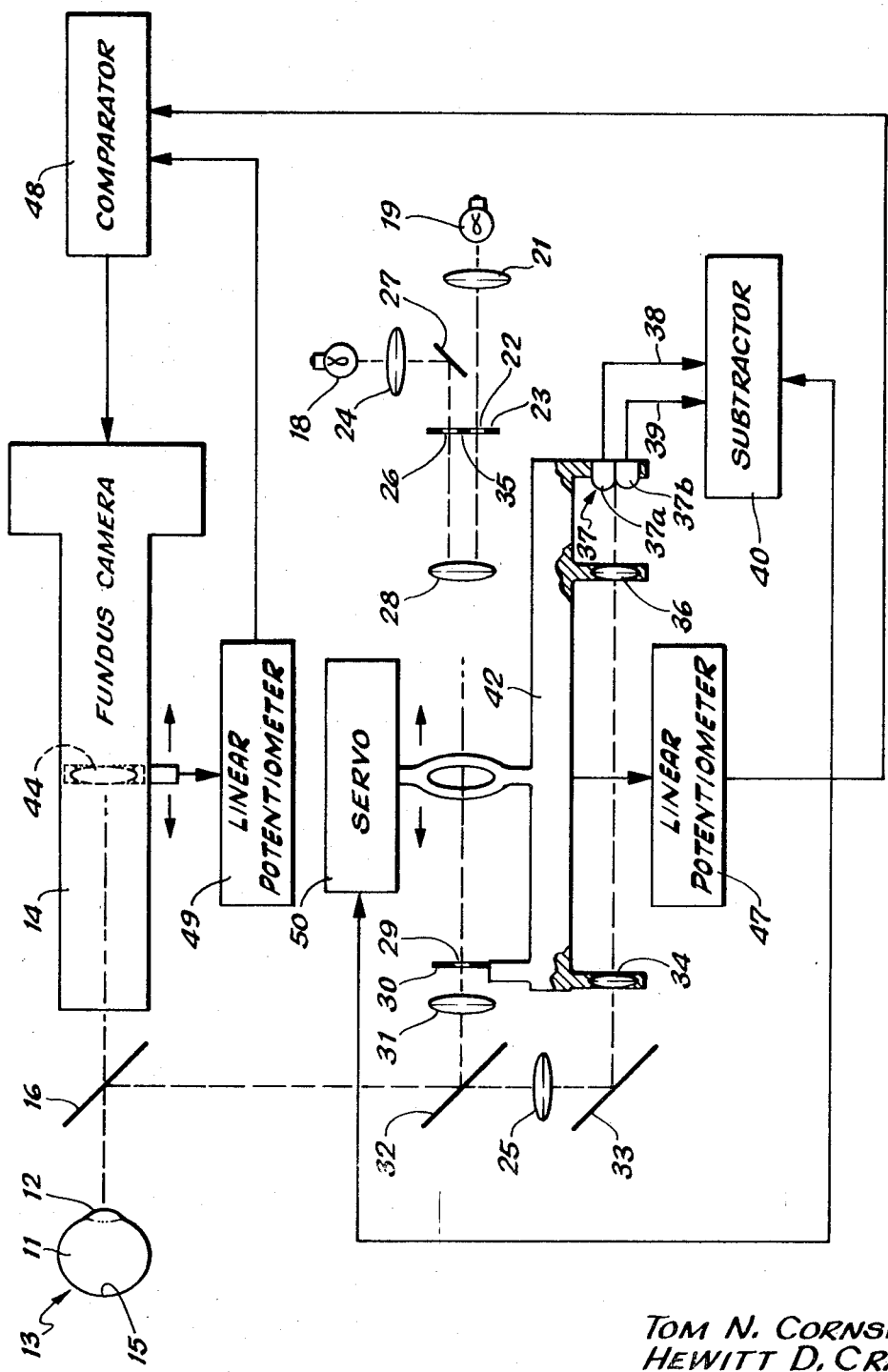

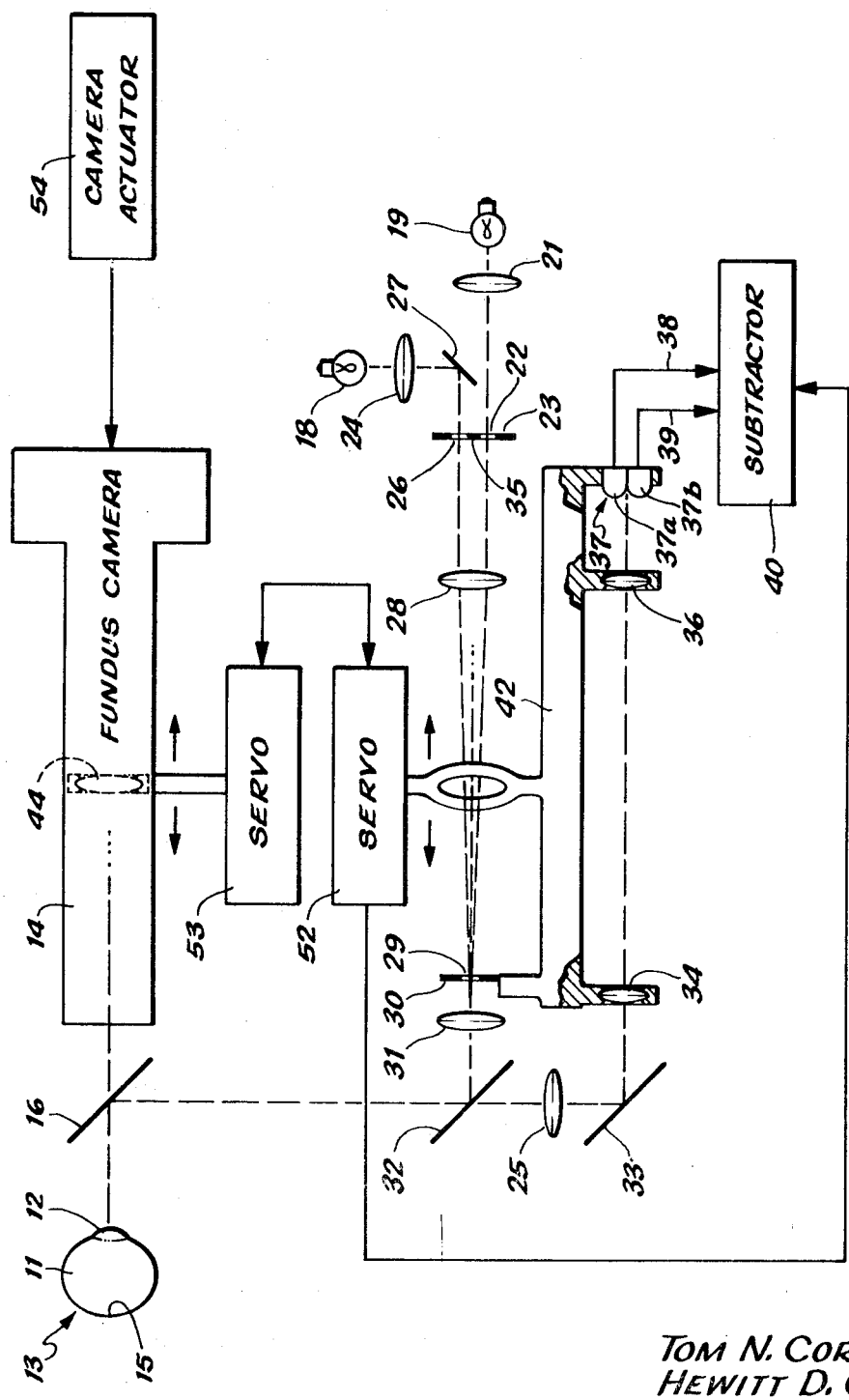

1

METHOD AND SYSTEM FOR TAKING PHOTOGRAPHS OF AN EYE FUNDUS

BACKGROUND OF THE INVENTION

At the present time ophthalmoscopic examination of the human eye is limited by several factors. These factors include the quality of the optics of the eye and the fact that instantaneous movements of the eye and changes in its refractive stage take place. Such examinations are necessary to enable a physician to judge the condition of a patient's vascular system. In addition, ophthalmoscopic examinations may indicate the presence of brain tumors, certain systemic disorders such as diabetes, or other disorders of the eye and retina.

Fundus cameras exist for taking photographs of the fundus or retina of an eye. The fundus cameras avoid the blurring of the photograph that would be caused by eye movements by delivering the exposure light for the photograph in an extremely brief flash. These fundus cameras form their images through the optics of the eye itself and are focused by an operator who adjusts the focus while examining the image visually. After focusing, the operator turns off a focusing light and then releases a viewing mirror which fires a flashtube such as a xenon flashtube for providing photographic exposure illumination. The procedure results in two kinds of focus errors. First, the precision with which the operator can focus visually is limited. Second, any changes in the refractive strength of the patient's eye between the time the operator focuses the camera and the time he takes the photograph will result in focus error.

Focus errors seriously limit the usefulness of fundus cameras. The typical fundus camera now on the market, such as that made by Carl Zeiss, Inc. has in it optical elements that compensate for the chromatic and some of the spherical aberration of the eye, and take diffraction-limited photographs when the focus is optimal and the aberrations of the particular eye are small. The Zeiss Camera, for example, takes its photographs through a 2.3 mm. pupil resulting in a diffraction limit of approximately 1 minute or arc on the retina. With that size pupil a focus error of only 0.2 diopter will cut the resolution approximately in half. The focus error of 0.2 diopter is to be compared to the total refractive strength of the eye which is approximately 60 diopters. If the fundus photograph were taken through a larger pupil the diffraction limit would improve in direction proportion, but the accuracy of focus required would increase by the same proportion. Thus with a 7.5 mm. pupil the diffraction-limited resolution would be improved by a factor of 3, so long as focus errors were restricted to less than 0.07 diopter. An improvement by a factor of 3 in resolution of fundus photographs would permit the examination of many features of the retina that are just beyond examination now, such as capillaries arterial walls, etc.

Still another problem which exists with fundus cameras is that with an ordinary fundus camera the patient's eye must be drugged to dilate his pupil in order to permit the entry of enough illuminating light while still avoiding obsuration of the photograph by light reflected from the cornea of the eye. The problem is that the pupil is naturally large enough only in darkness but to focus the camera a strong light must fall on the retina. Drugs are undesirable because they should be not administered to some patients, such as those with possible glaucoma. Further, drugs produce prolonged discomfort in some patients, and in most states only physicians are permitted to administer drugs, thus preventing optometrists from using fundus cameras.

BRIEF SUMMARY OF THE INVENTION

Accordingly, it is an object of this invention to provide an improved method and system for providing high resolution photographs of the fundus of an eye.

It is another object of this invention to provide a method and system for photographing an eye fundus which does not require administering drugs to the eye.

Briefly, in accordance with one embodiment of the invention, an optical system is provided which includes an eye station for establishing the position of an eyelens and a fundus camera which is aligned with the eye station. An automatic optometer is optically coupled to the eye station and is adapted to sense the instantaneous refractive power of the eye. Means are provided for varying the focus of the fundus camera and means are coupled to the automatic optometer and fundus camera for activating the fundus camera to take a photograph when the focus of the fundus camera matches the instantaneous refractive power of the eye.

A more complete understanding of the invention may be had from the following description and claims, taken in conjunction with the accompanying drawings.

BRIEF DESCRIPTION OF THE DRAWINGS

FIG. 1 is a schematic diagram of an optical system in accordance with this invention in which means for focusing the optometer are mechanically coupled to means for focusing the fundus camera.

FIG. 2 is an elevational view of the semicircularly apertured plane of FIG. 1.

FIG. 3 is another embodiment of an optical system similar to that of FIG. 1 but in which the focusing means for the optometer produces an electrical signal and the focusing means for the fundus camera produces an electrical signal, which electrical signals are compared in a comparator.

FIG. 4 is another embodiment of an optical system similar to that of FIG. 1 but in which the optometer produces an electrical signal indicative of the refractive state of the eye and which signal controls focusing means for the fundus camera.

DESCRIPTION OF THE PREFERRED EMBODIMENTS

This invention consists of a method and system for combining a fundus camera with an automatic infrared optometer in a manner such that high resolution photographs of an eye fundus may be taken. A suitable automatic infrared optometer is described in a copending patent application, entitled: Automatic Optometer for Measuring the Refractive Power of the Eye, SR. No. 673,680, filed Oct. 9, 1967, and assigned to the assignee of the present invention.

An automatic optometer measures the refractive power of the eye by projecting narrow beams of light at at least two small areas of the entrance pupil of the eye, the refractive surfaces of the eye directing the beams to the retina or fundus. The refractive elements of the eye are primarily the air-to-cornea interface and the various interfaces related to the lens within the eye. For general purposes, all of these elements may be considered as a single refractive element, which will be referred to herein as the eyelens. If the angles at which the beams strike the eyelens are properly related to the focusing power of the eyelens the beams will be directed onto the same area of the retina, i.e., they will completely overlap. If the relative angles of incidence of the beams and the refractive or focusing power of the eyelens are not properly related, the images on the retina will be separated. A determination of whether the several beam images on the retina are overlapping or not is made by directing light passing out of the eyelens through a converging lens which forms an image of the light patterns on the retina. The relative angles of incidence of the narrow beams on the eyelens are then altered to make the retina images overlap and the angles required to achieve overlapping indicate the refractive power of the eyelens.

Referring to FIG. 1, there is shown one embodiment of a fundus camera combined with an automatic infrared optometer in accordance with this invention. An eye 11 having a lens 12 is disposed at an eye station generally indicated by reference numeral 13. A fundus camera 14, which may, for example, be any of the variety of standard fundus cameras on the market such as that made by Carl Zeiss, Inc. is aligned with the eye 11 and is separated therefrom by a dichroic mirror 16 disposed at an angle with respect to the axis of the fundus camera and eye. The dichroic mirror 16 is adapted to transmit visible light and reflect infrared light. An automatic infrared optometer 17 is optically coupled to the eye 11 and eye station 13 by means of the dichroic mirror 16, as will more fully appear hereinafter. The optometer 17 comprises two light sources 18 and 19 which may be infrared light-emitting diodes. A lens 21 images the light source 19 in an aperture 22 of a plane. A lens 24 images the light source 18 in an aperture 26 of the plane 23 after being reflected by a mirror 27. An elevational view of the plane 23 is shown in FIG. 2. The light sources 18 and 19 are alternately excited so that the semicircular apertures 22 and 26 of plane 23 which are separated by a distance $d$ are alternately illuminated. Light emerging from the apertures 22 and 26 of plane 23 passes through a lens 28, and aperture 29 of a plane 30 and a lens 31 and is reflected by a beam splitter 32, which may be a half-silvered mirror, to the dichroic mirror 16. The dichroic mirror 16 reflects the infrared light through the eyelens 12 onto the fundus area or retina 15 of the eye 11.

The lens 28 is positioned a distance $f_1$ from the semicircular apertures 22 and 26 equal to the focal length of the lens 28. The light passing through the semicircular apertures 22 and 26 is thus collimated by the lens 28.

A plane 30 is positioned in front of the lens 28 to stop all of the light therefrom except light passing through a small aperture 29, which may be rectangular A lens 31 is positioned in front of the plane 30 and is located at a distance $f_2$ with respect to the pupil of the eye 11, which places the pupil of the eye 11 at the focal plane of lens 31. Thus only a very narrow beam of light, proportional to the area of the semicircular apertures 22 and 26 passes through the eyelens 12 at any instant.

The rectangular aperture 29 is adapted to be imaged by the lens 31 and the eyelens 12 on the fundus or retina of the eye 15. If the plane 30 is located with respect to the lens 31 and eyelens 12 such that the image of the aperture 29 is sharply focused on the retina 15, the image will not move as the light sources 18 and 19 are alternated. However, if the plane 30 is not conjugate with the retina, then the image of the aperture 29 will shift back and forth on the retina as the light sources 18 and 19 are alternated due to the distance $d$ which separates the semicircular apertures 22 and 26. With any given instantaneous refractive power of the eyelens 12, the images of the aperture 29 on the retina 15 as the light sources are alternated may be caused to completely overlap by displacing the plane 30 until it is conjugate with the retina 15.

The optometer 17 further includes means for sensing whether the image of the rectangular aperture 29 on the eye fundus or retina 15 moves as the light sources 18 and 19 are alternated. The images on the fundus 15 are reflected back through the eyelens 12 and are reflected downward by the dichroic mirror 16, A portion of this reflected light is passed through the beam splitter 32 and the lens 25 and is reflected by a mirror 33. This light reflected by the mirror 33 passes through a lens 34, a lens 36 and is incident on a split field photodetector 37 having fields 37a and 37b. The lens 25 forms an image of the retinal image in the space between it and the lens 34. The combination of lens 34 and lens 36 reimage the retinal image on the photodetector 37. Conductors 38 and 39 connect the photodetector fields 37a and 37b, respectively, to a subtractor 40.

If the aperture 29 is sharply focused on the retina 15 then its image on the retina 15 will not move as the light sources 18 and 19 are alternated. In this case the light sensed by the two photodetector fields 37a and 37b will not vary and the difference between the amounts of light detected by the two fields 37a and 37b are electrically subtracted by the subtractor 40 so that the output 41 of the subtractor 40 is a nonvarying quantity. However, if the rectangular aperture 29 is not focused on the retina 15 then its images provided by the light sources 18 and 19 will vary in position as the light sources 18 and 19 are alternately excited. In this event the reflected light incident on the two fields 37a and 37b will vary and the difference between the electrical outputs of the two fields, as present on conductors 38 and 39, will contain an AC component which will be present on the output 41 of this subtractor 40.

One common difficulty encountered in detecting light reflected from the retina of an eye is that light reflected from the corneal surface of the eye can seriously obstruct the measurement. In accordance with this invention, the light reflected from the eye cornea is prevented from entering the sensing means in the following manner. The plane 23 includes a dark bar 35 of appreciable width between the two semicircular apertures 26 and 22 which are illuminated by the sources 18 and 19 respectively. When a pattern of illumination such as that in the plane 23 falls on a curved convex mirror such as the cornea of the eye, the light reflected from the cornea forms into two approximately half-conical forms. Therefore, a cross section through the light reflected by the cornea appears the same as the pattern of semicircular apertures in the plane 23, but enlarged in proportion to the distance from the cornea. When the eye 11 is properly aligned at the eye station 13, these two conical batches of light fall one on each side of the lens 25. That is, the dark bar 35 between the two lighted semicircular apertures 22 and 26 is projected onto the lens 25. Therefore, the light reflected from the cornea does not enter the detection optics and does not fall on the photodetector 37.

The automatic optometer 17 includes positioning means in the form of a focusing member 42 which is mechanically coupled by a coupling member 43 to adjustable focusing means 44 for the fundus camera 14. The focusing means 44 may be one of the lenses in the optical arrangement of the fundus camera 14 or it can be the film plane of the camera. The focusing member 42 has mounted thereon the aperture plane 30, the lens 24, the lens 36 and the split field photodetector 37 having fields 37a and 37b. All of these elements are fixed with respect to each other since they are mechanically mounted to the focusing member 42. However, the focusing member 42 together with the coupling member 43 and the focusing means 44 for the fundus camera 14 are adapted for lateral movement in order to change the distance between all these elements and the eye station 13. The coupling member 43 couples the focusing member 42 and the focusing means 44 of the fundus camera 14 so that when the aperture 29 in plane 30 is focused on the retina or fundus 15 of the eye 11, focusing means 44 is disposed in such a position that the fundus camera 14 is also focused in the fundus 15. Coupling means 43 may include gearing for varying the coupling ratio between the fundus camera and optometer. The particular ratio depends on the ratio of the focal length of the lens in the fundus camera and the lenses 31 and 25.

In operation, when the automatic optometer 17 is focused so that the aperture 29 is sharply focused on the fundus 15, and does not move as the light sources are alternated, the output 41 of subtractor 40 will contain no AC components. With the optometer focused the fundus camera 14 will also be focused on the retina 15. An AC null detector 46 is connected to the output 41 and furnishes a signal to the fundus camera 14 which is adapted to activate a mechanism in the fundus camera 14 so that a photograph of the fundus 15 is obtained. The activating mechanism for the fundus camera 14 is not shown in FIG. 1 and may consist of simply a switch for firing a xenon flashtube within the camera 14 for providing photographic exposure light. Thus the fundus camera 14 is only activated to take a photograph when the output 41 of subtractor 40 contains no AC components. This output only contains no AC components when the automatic optometer, and hence the fundus camera 14 since it is coupled to the optometer by the coupling member 43, is focused sharply on the fundus of the eye 15. Thus high resolution photographs of the fundus 15 may be obtained.

In accordance with this invention no complicated adjustments are necessary in order to take high resolution photographs of the fundus 15. All an operator is required to do is move the focusing means 42 of the automatic optometer back and forth until the AC null detector 46 detects a null. When this AC null is detected the fundus camera 14 is activated to take a photograph and the photograph will be a high-resolution photograph because the camera 14 is exactly focused on the fundus 15. Further, in accordance with this invention the light sources 18 and 19 emit infrared light so that for most patients it is not necessary to dilate the pupil of the eye 11 in order for it to remain wide enough to take an acceptable photograph. The eye station 13 and all the apparatus including the automatic optometer 17 and the fundus camera 14 may be disposed in a darkened room so that the pupil of the eye 11 is naturally wide. Therefore, drugs to artificially dilate the pupil are not necessary except in patients with constricted pupils.

Referring now to FIG. 3, there is shown another embodiment of the invention in which an automatic optometer is combined with a fundus camera to secure high-resolution photographs of an eye fundus. Elements of the eye, the automatic optometer and the fundus camera in FIG. 3 which are the same as elements in the embodiment of FIG. 1 are given like reference numerals. As before, an eye 11 is situated at an eye station 13 and has a lens element 12 and a fundus or retina 15. A fundus camera 14, which has focusing means 44, is aligned with the eye station 13 and a dichroic mirror 16 separates the eye station 13 and the fundus camera 14. Alternately excited infrared light sources 18 and 19 are focused by the lens 24 and 21 and the mirror 27 in the plane of the semicircular apertures 22 and 26 of the plane 23. The lens 28 collimates the light passing through the semicircular apertures 22 and 26 and forms images of the apertures in its focal plane, which is the plane of the pupil of the eye. The rectangular aperture 29 in the plane 30 is imaged in the retina 15 of the eye. If this rectangular aperture 29 is in the plane such that it is sharply focused on the retina 15 of the eye then its image will not move on the retina 15 when the light sources 18 and 19 alternate. However, if the image of the rectangular aperture 29 is not conjugate with the retina 15 its image will shift back and forth on the retina 15 as the light sources 18 and 19 are alternated.

Light reflected back from the retina reflects from the dichroic mirror 16 and a portion of this reflected light passes through the beam splitter 32 and the lens 25. This portion is reflected by the mirror 33 through the lens 34 and the lens 36 onto the two fields 37a and 37b of the split field photodetector 37. The outputs 38 and 39 in the split field photodetector 37 are subtracted in a subtractor 40. The amplitude of the AC component of this difference is a function of the amount by which the apertures 29 is defocused in the retina 15. When the AC component goes to zero, the aperture 29 is exactly conjugate with the retina 15.

The focusing member 42 for the automatic optometer and the focusing means 44 for the fundus camera are both adapted to latterly translate for adjusting the focus of the optometer and fundus camera respectively. The focusing member 42 of the optometer is connected to a linear potentiometer 47 which is adapted to sense the position of the focusing means 42 (and hence the focus of the automatic optometer) and supply an electrical signal proportional thereto to a comparator 48. Similarly, the focusing means 44 of the fundus camera 14 is connected to a linear potentiometer 49, which is adapted to generate a signal which is supplied to the comparator 48, which signal is proportional to the focus of the fundus camera 14. A servo 51 is associated with the focusing member 42 for the optometer and controls the optometer's lateral position. The servo 51 is driven by the subtractor 40 in such a manner that the servo 51 controls the focusing member 42 to always keep the automatic optometer focused with respect to the retina 15 of eye 11. That is, the amplitude of the AC component of the output of the subtractor 40 is a function of the amount by which the aperture 29 is defocused in the retina 15. When this AC component goes to zero the aperture 29 is exactly conjugate with the retina. The subtractor 40 controls the servo 51 so that the focusing member 42 is driven back and forth to follow changes in the refractive power of the eyelens 12 so that the aperture 29 is always kept in focus on the retina 15 of eye 11. The polarity of the driving signal for servo 51 can be determined by the phase relation between the alternation of the light sources 18 and 19 and the alternation of the outputs of the split field photodetector 37. The output of the linear potentiometer 47 which is applied to the comparator 48 is an electrical signal which is proportional to the position of the focusing member 42 and is thus indicative of the instantaneous refractive power of eyelens 12. Similarly, the output of the linear potentiometer 49 is an electrical signal which is proportional to the focus of the fundus camera 14. The comparator 48 is adapted to compare the outputs of the linear potentiometers 47 and 49 and generate a camera actuation signal when the signals are equal. Equality of the signals means that the fundus camera 14 is focused at the same point as the automatic optometer and since the automatic optometer is driven by servo 51 to always follow changes in the refractive index of the eyelens 12 then the fundus camera is also focused on the retina 15.

In operation, an operator aligns the eye 11 at eye station 13 and actuates the automatic optometer. The automatic optometer is driven by servo 51 back and forth so that it follows changes in the refractive index of the eyelens 12 so that the rectangular aperture 29 is always conjugate with the retina 15. The fundus camera 14 can be simply manually driven over a range of focus. When the focusing means 44 is in focus on the retina 15 the inputs to comparator 48 from potentiometers 47 and 49 will be the same. The comparator 48 then generates a camera actuation signal which actuates the fundus camera 14 to take a photograph of the eye fundus 15.

FIG. 4 shows still another embodiment similar to that of FIG. 1 but utilizing electrical coupling means between the fundus camera and the optometer. Elements in the embodiment of FIG. 4 which are unchanged from the embodiment of FIG. 1 are given like reference numerals. As before, an eye 11 is situated at an eye station 13 and has a lens element 12 and a fundus or retina 15. A fundus camera 14, which has focusing means 44, is aligned with the eye station 13 and a dichroic mirror 16 separates the eye station 13 and the fundus camera 14. Alternately excited infrared light sources 18 and 19 are focused by the lenses 24 and 21 and the mirror 27 in the plane of the semicircular apertures 22 and 26 of the plane 23. The lens 28 collimates the light passing through the semicircular apertures 22 and 26 and forms images of the apertures in its focal plane, which is the plane of the pupil of the eye. The rectangular aperture 29 in the plane 30 is imaged in the retina 15 of the eye. If this rectangular aperture 29 is in the plane such that it is sharply focused on the retina 15 of the eye then its image will not move on the retina 15 when the light sources 18 and 19 alternate. However, if the image of the rectangular aperture 29 is not conjugate with the retina 15, its image will shift back and forth on the retina 15 as the light sources 18 and 19 are alternated.

Light reflected back from the retina reflects from the dichroic mirror 16 and a portion of this reflected light passes through the beam splitter 32 and the lens 25. This portion is reflected by the mirror 33 through the lens 34 and the lens 36 onto the two fields 37a and 37b of the split field photodetector 37. The outputs 38 and 39 in the split field 37 are subtracted in a subtractor 40. The amplitude of the AC component of this difference is a function of the amount by which the aperture 29 is defocused in the retina 15. When the AC component goes to zero, the aperture 29 is exactly conjugate with the retina 15.

The focusing member 42 for the automatic optometer and the focusing means 44 for the fundus camera are both adapted to latterly translate for adjusting the focus of the optometer and fundus camera respectively.

A servo 52 is associated with the focusing member 42 and is adapted to laterally translate the focusing member 42 back and forth. The servo 52 receives a signal from the subtractor 40 and this signal controls the servo 52 to cause it to move the focusing member 42 back and forth to follow changes in the refractive power of the eyelens 12 so that the rectangular aperture 29 is always conjugate with the retina 15. A servo 53 is provided which is connected to the focusing means 44 of the fundus camera 14 and is adapted to move the focusing means 44 back and forth in the direction of the arrows in FIG. 4. The servo 53 is interconnected and driven by the servo 52. Thus the servo 53 is driven to move the focusing means 44 so that the focus of the fundus camera 14 always matches the focus of the optometer and hence the instantaneous refractive power of the eyelens 12. A camera actuator 54 is provided for actuating the fundus camera 14 to take a photograph. The camera actuator 54 may simply be a switch or the like for activating a xenon flashlamp within the fundus camera 14 for providing photographic exposure light. Since the focusing means 44 of the fundus camera tracks the movement of the focusing member 42 of the optometer and the focusing member 42 is controlled by the subtractor 40 to always follow changes in the refractive power of the eyelens 12, then the fundus camera 14 is always focused on the retina 15. High-resolution photographs of the retina or fundus 15 may thus be obtained with the camera actuator 54 actuating the fundus camera 14 at any convenient time.

Thus what has been described is a method and system for taking high-resolution photographs of an eye fundus or retina. An automatic infrared optometer and a fundus camera are combined to achieve this high-resolution photography. The automatic infrared optometer is adapted to sense the instantaneous refractive power of the eyelens and the automatic optometer controls focusing means for the fundus camera. Thus the focus of the fundus camera can be controlled to match exactly the instantaneous refractive power of the eye so that high-resolution photographs may be obtained. Further, for most patients, no drugs are necessary to dilate the pupil of an eye whose fundus is to be photographed. The entire photographing operation may be carried on in a darkened room such that the eye pupil is naturally dilated sufficiently for the fundus camera to take a satisfactory photograph. Since the light employed by the automatic optometer for sensing the refractive power of the eye is infrared, the eye is not noticeably affected thereby. That is, the patient does not realize that a light is falling on the eye and the patient's pupil is not affected by the infrared light.

Although the invention has been described with respect to specific embodiments, it will be obvious to those skilled in the art that minor modification and changes may be made to the embodiments disclosed herein without departing from the true spirit and scope of the invention.

We claim:

1. A method for photographing the fundus of an eye having a lens comprising the steps of establishing the position of the eye at an eye station, aligning a fundus camera with the eye station, optically coupling an automatic optometer to the eye station, sensing with the automatic optometer the instantaneous refractive power of the eyelens, controlling the focus of the fundus camera whereby the focus of the fundus camera matches the instantaneous refractive power of the eyelens, and actuating the fundus camera to take a photograph of the eye fundus when the focus of the fundus camera matches the instantaneous refractive of the eyelens.

2. An optical system for photographing the fundus of an eye having a lens comprising in combination an eye station for establishing the position of the eye, a fundus camera aligned with the eye station, an automatic optometer optically coupled to the eye station and including means for sensing the instantaneous refractive power of the eye, focusing means for varying the focus of said fundus camera, and means coupled to said automatic optometer and said fundus camera for activating said fundus camera to take a photograph when the focus of said fundus camera matches the instantaneous refractive power of the eye.

3. An optical system as in claim 2 wherein said automatic optometer comprises light means for projecting light generally along first and second predetermined optical paths a first lens for controlling said light from said light means, aperture means for passing a portion of collimated light from said lens therethrough, a second lens positioned in front of said aperture means for forming an image of said light means substantially in the plane of the eyelens, and detecting means for detecting movement of said image on the retina.

4. An optical system as in claim 3 including positioning means for adjusting the position of said aperture means with respect to the eyelens until said image does not move on the retina, a coupling member for mechanically coupling said positioning means to said focusing means for said fundus camera whereby said fundus camera is focused on the retina when said image does not move on the retina, and actuating said fundus camera to take a photograph when said image does not move on the retina.

5. An optical system as in claim 3 including positioning means for adjusting the position of said aperture means with respect to the eyelens, servo means responsive to said detecting means for adjusting said positioning means until said image does not move on the retina, a comparator having first and second inputs and an output, first electrical means connected to said positioning means and adapted to supply on said first comparator input a signal indicative of the position of said positioning means, which corresponds to the instantaneous refractive power of the eyelens, second electrical means connected to said focusing means for said fundus camera and adapted to supply on said second comparator input a signal indicative of the focus of said fundus camera, said comparator generating a signal on said comparator output when the focus of said fundus camera corresponds to the instantaneous refractive power of the eyelens, and actuating means responsive to said comparator output for actuating said fundus camera to take a photograph of the eye fundus.

6. An optical system as in claim 3 including positioning means for adjusting the position of said aperture means with respect to the eyelens, first servo means responsive to said detecting means for continuously adjusting said positioning means whereby said image does not move on the retina, said first servo means including means for generating a position signal corresponding to the position of said positioning means which is indicative of the instantaneous refractive power of the eyelens, second servo means connected to said focusing means of said fundus camera and responsive to said position signal to adjust said focusing means whereby the focus of said fundus camera corresponds to the instantaneous refractive power of the eyelens and said fundus camera is focused on the retina of the eye, and actuating means for actuating said fundus camera to take a photograph of the retina.

7. An optical system as in claim 3 wherein said light means includes first and second infrared light sources which are alternately excited for alternately projecting infrared light along said first and second predetermined optical paths, respectively.

8. An optical system as in claim 7 wherein said light means further includes a plane having first and second semicircular apertures separated by a dark area, said first and second semicircular apertures aligned with said first and second predetermined optical paths and stopping all but a semicircular pattern of light from said first and second infrared light sources, respectively, whereby corneal reflections from the eye are prevented from affecting said detecting means.

9. An optical system as in claim 8 wherein said detecting means comprises a split field photodetector, having first and second outputs, optical means for projecting said image on the retina to said split field photodetector, a subtractor for generating an electrical signal proportional to the difference between said first and second photodetector outputs, and a null detector for detecting the absence of AC components in said electrical signal proportional to the difference between said first and second photodetector outputs.